United States Patent
Lomask et al.

(10) Patent No.: US 8,849,574 B2
(45) Date of Patent: Sep. 30, 2014

(54) SYSTEM AND METHOD FOR PERTURBING AN INITIAL HORIZON-PICKING SOLUTION TO FOLLOW LOCAL FEATURES OF A VOLUME

(75) Inventors: Jesse Mathias Lomask, Oakland, CA (US); Jason Michael Francis, Houston, TX (US); William Stephen Kowalik, Subiaco (AU); Younis Altobi, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 439 days.

(21) Appl. No.: 13/193,300

(22) Filed: Jul. 28, 2011

(65) Prior Publication Data

US 2013/0030710 A1    Jan. 31, 2013

(51) Int. Cl.
*G01V 1/00*    (2006.01)
*G01V 1/30*    (2006.01)

(52) U.S. Cl.
CPC ........................................ *G01V 1/30* (2013.01)
USPC ................................................ 702/17; 702/11

(58) Field of Classification Search
USPC ....................................... 702/1–2, 11, 14–18
See application file for complete search history.

(56) References Cited

U.S. PATENT DOCUMENTS

| | | | |
|---|---|---|---|
| 6,853,922 B2 * | 2/2005 | Stark | 702/14 |
| 7,769,545 B2 | 8/2010 | Lomask et al. | |
| 7,769,546 B2 | 8/2010 | Lomask et al. | |
| 2009/0204332 A1 * | 8/2009 | Lomask et al. | 702/16 |

OTHER PUBLICATIONS

Maria Faraklioti and Maria Petrou, Horizon Picking in 3D Seismic Images, 2003, University of Surrey and the Institute of Telematics, 216-222.*
Derek Praks, Seismic image flattening as a linear inverse problem, Feb. 19, 2010, Center for Wave Phenomena, Colorado School of Mines, Master of Science Thesis-Mathematical and Computer Sciences, pp. 1-36.*
Michel Leger and Muriel Thibaut, A least-square method for multisurface unfolding, 1997, Journal of Structural Geology, vol. 19, No. 5, pp. 735-743.*
Lomask Seismic Volumetric Flattening & Segmentation, 2006 PhD dissertation, Stanford University, p. 129-130.
Lomask and Guitton, Volumetric flattening: an interpretation tool, 2007 The Leading Edge.
Lomask and Guitton, Flattening with geological constraints, 2006 SEG/New Orleans Annual Meeting.
Lomask et al., Flattening without picking, 2006 Geophysics vol. 71, pp. 13-20.
Parks, Seismic image flattening as a linear inverse problem, 2010 Master of Science Thesis, Colorado School of Mines.

(Continued)

*Primary Examiner* — John Breene
*Assistant Examiner* — Eman Alkafawi
(74) *Attorney, Agent, or Firm* — Albert K. Shung (57) ABSTRACT

A horizon-picking solution for a geological volume of interest is determined. To determine the horizon-picking solution, a plurality of horizons through the geological volume of interest included in an initial horizon-picking solution are perturbed to more closely follow the local character of measured data related to the geological volume of interest. In particular, the horizons may be perturbed simultaneously by blending the initial solution with a secondary horizon-picking solution that automatically identifies a plurality of horizons through the geological volume of interest that follow the measured data related to the geological volume of interest.

21 Claims, 5 Drawing Sheets

(56) References Cited

OTHER PUBLICATIONS

Stark, Relative geologic time (age) volumes—Relating every seismic sample to a geologically reasonable horizon 2004 The Leading Edge.

Van Hoek et al., Geometric attributes for seismic stratigraphic interpretation 2010, The Leading Edge.

Zeng et al., Stratal slicing, Part 1: Realistic 3-D seismic model, 1998 Geophysics vol. 63, No. 2 pp. 502-513.

Zeng et al., Stratal slicing, Part II: Realistic 3-D seismic model, 1998 Geophysics vol. 63, No. 2 pp. 514-522.

Chopra et al., Volumetric curvature attributes adding value to 3D seismic data interpretation, 2007, SEG/San Antonio Annual Meeting.

De Bruin et al., Stratigraphic surfaces in the depositional and chronostratigraphic (Wheeler-transformed) domain, Jul. 2007, The Leading Edge.

De Groot, The horizon cube: A step change in seismic interpretation!, Sep. 2010, The Leading Edge.

De Groot, How to create and use 3D Wheeler transformed seismic volumes, 2006 SEG/New Orleans Annual Meeting.

Fomel, Predictive painting of 3D seismic volumes, Geophysics vol. 75, No. 4 Jul./Aug. 2010, pp. 25-30.

Fomel, Applications of plane-wave destruction filters, Geophysics vol. 67, No. 6 Nov./Dec. 2002, pp. 1946-1960.

\* cited by examiner

SYSTEM AND METHOD FOR PERTURBING AN INITIAL HORIZON-PICKING SOLUTION TO FOLLOW LOCAL FEATURES OF A VOLUME

FIELD

The disclosure relates to determining a horizon-picking solution for a three-dimensional geological volume of interest by perturbing a plurality of horizons included in an initial horizon-picking solution to follow local features present in volume information representing the geological volume of interest.

BACKGROUND

Various types of algorithms for identifying horizons within a geological volume of interest are known. Typically, these algorithms tend either to focus on following large-scale features of data representing the geological volume of interest, or to focus on following more local features of the data. For example, stratal-slicing solutions that use one or more reference horizons to interpolate and/or extrapolate a whole series of horizons through the geological volume of interest tend to be more faithful to large-scale features. These solutions tend to miss, or be inaccurate with respect to, local features of the underlying data.

It is also known that individual horizons can be moved, adjusted, or "snapped" to align with an individual feature present in the data representing a geological volume of interest. For example, an individual horizon can be snapped to a local trough or peak. However, these techniques often cause jumps or discontinuities because points along a single horizon may snap to different events. Therefore, this typically requires manual oversight, if not direct control, and only aligns an individual horizon with an individual feature.

SUMMARY

One aspect of the disclosure relates to a method of determining a horizon-picking solution within a geological volume of interest. In some embodiments, the method comprises obtaining volume information representing a geological volume of interest; obtaining an initial horizon-picking solution for the geological volume of interest derived from the volume information, wherein the initial horizon-picking solution includes an initial set of horizons through the geological volume of interest; and determining a final horizon-picking solution for the geological volume of interest by perturbing the horizons in the initial set of horizons simultaneously to follow local features of the geological volume of interest represented in the volume information to obtain a final set of horizons through the geological volume of interest.

Another aspect of the disclosure relates to machine-readable, non-transient, electronic storage storing processor-executable instructions for performing a method of determining a horizon-picking solution within a geological volume of interest. In some embodiments, the method comprises obtaining volume information representing a geological volume of interest; obtaining an initial horizon-picking solution for the geological volume of interest derived from the volume information, wherein the initial horizon-picking solution includes an initial set of horizons through the geological volume of interest; and determining a final horizon-picking solution for the geological volume of interest by perturbing the horizons in the initial set of horizons simultaneously to follow local features of the geological volume of interest represented in the volume information to obtain a final set of horizons through the geological volume of interest.

Yet another aspect of the disclosure relates to a system configured to determine a horizon-picking solution within a geological volume of interest. In some embodiments, the system comprises one or more processors configured to execute computer program modules. The computer program modules may comprise a volume information module, an initial solution module, a perturbation module, and/or other modules. The volume information module is configured to obtain volume information representing a geological volume of interest. The initial solution module is configured to obtain an initial horizon-picking solution for the geological volume of interest derived from the volume information, wherein the initial horizon-picking solution includes an initial set of horizons through the geological volume of interest. The perturbation module is configured to determine a final horizon-picking solution for the geological volume of interest by perturbing the horizons in the initial set of horizons simultaneously to follow local features of the geological volume of interest represented in the volume information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The present technology may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present technology may be coded in different languages for application in a variety of computing platforms and environments. It will be appreciated that the scope and underlying principles of the present technology are not limited to any particular computer software technology.

Moreover, those skilled in the art will appreciate that the present technology may be practiced using any one or combination of hardware and software configurations, including but not limited to a system having single and/or multi-processer computer processors system, hand-held devices, programmable consumer electronics, mini-computers, mainframe computers, and the like. The technology may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present technology. Such devices and articles of manufacture also fall within the spirit and scope of the present technology.

Referring now to the drawings, embodiments of the present technology will be described. The technology can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present technology are discussed below. The appended drawings illustrate only typical embodiments of the present technology and therefore are not to be considered limiting of its scope and breadth.

Figure 1:
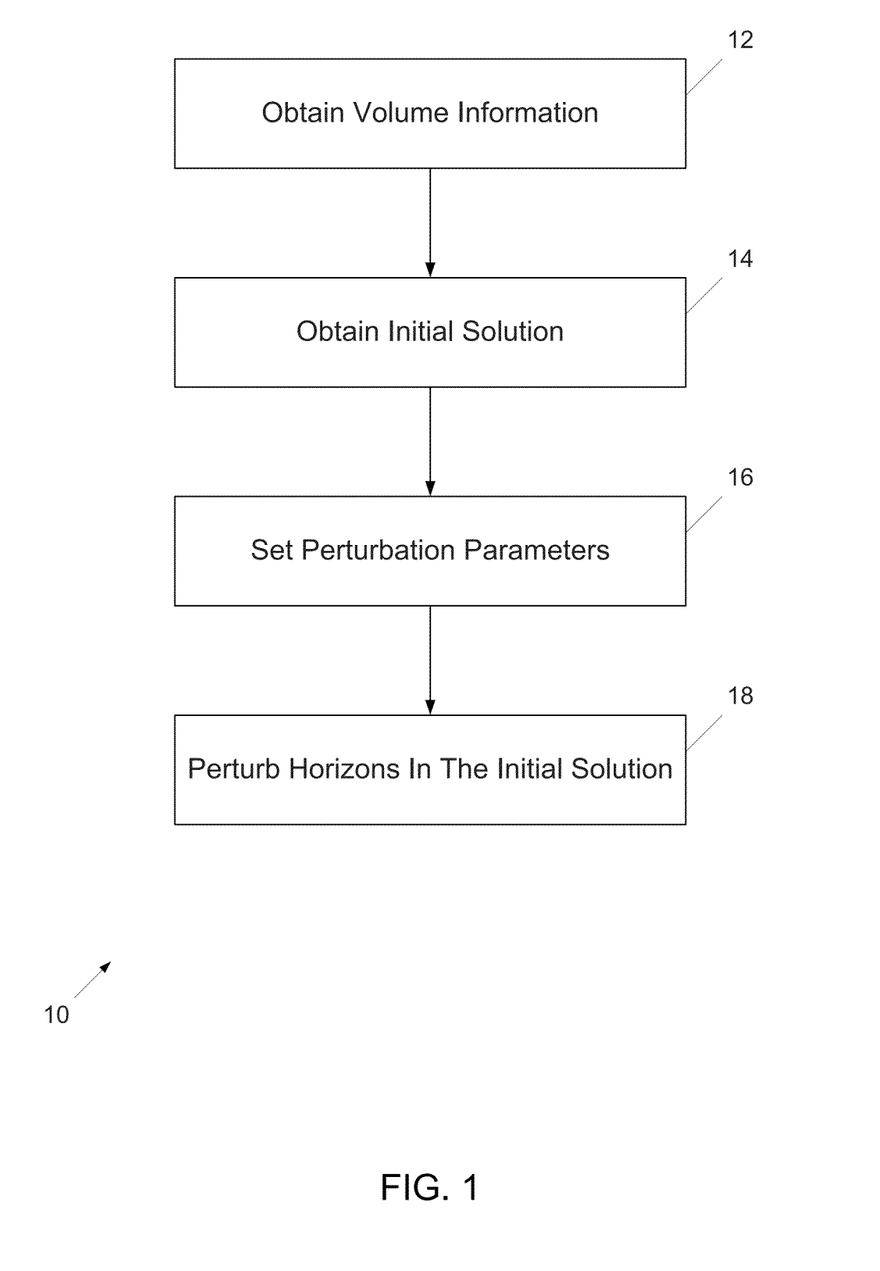
FIG. 1 illustrates a method of determining a horizon-picking solution for a geological volume of interest.

FIG. 1 illustrates a method 10 of determining a horizon-picking solution within a three-dimensional geological volume of interest. Method 10 includes perturbing an initial solution that includes a plurality of horizons through the geological volume of interest to more closely follow the local character of measured data related to the geological volume of interest. In particular, method 10 may perturb the horizons by blending the initial solution with a second horizon-picking solution that automatically identifies a plurality of horizons through the geological volume of interest that follow the measured data related to the geological volume of interest. This perturbation may be simultaneous for some or all of the horizons.

The operations of method 10 presented below are intended to be illustrative. In some embodiments, method 10 may be accomplished with one or more additional operations not described, and/or without one or more of the operations discussed. Additionally, the order in which the operations of method 10 are illustrated in FIG. 1 and described below is not intended to be limiting.

In some embodiments, method 10 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 10 in response to instructions stored electronically on an electronic storage medium. The one or more processing devices may include one or more devices configured through hardware, firmware, and/or software to be specifically designed for execution of one or more of the operations of method 10.

At an operation 12, volume information related to the geological volume of interest is obtained. The volume information may include measurements taken at or near the geological volume of interest, and/or information derived therefrom. By way of non-limiting example, the volume information may include one or more of seismic data acquired at or near the geological volume of interest, well data acquired at or near the geological volume of interest, core data from the geological volume of interest, a model (or other representation) of the geological volume of interest, and/or other information related to geological volume of interest. The volume information may be obtained from electronic storage, may be derived from previously stored information, and/or may be obtained from other sources.

At an operation 14, an initial horizon-picking solution is obtained. The initial solution includes a set of horizons running through the geological volume of interest that are represented by the volume information. The initial solution specifies the spatial location of the individual horizons within the geological volume of interest and/or a model (or other representation) of the geological volume of interest. As used here, a "horizon" may refer to a surface separating two different stratal layers. A horizon may be associated with a seismic reflection that can be carried over a relatively large area. Obtaining the initial solution may include retrieving or receiving the initial solution from electronic storage, deriving the initial solution, obtaining user input specifying the initial solution, and/or obtaining the initial solution from other sources. The initial horizon-picking solution may be determined based on the volume information obtained at operation 12.

The initial solution may be determined or derived using any technique or algorithm for identifying horizons within geological volume of interest. These techniques and/or algorithms may include manual techniques, automatic techniques, and/or hybrid techniques that include both manual and automatic operations. By way of non-limiting example, the initial solution may include a stratal slicing solution in which a preliminary horizon or horizons are used to extrapolate and/or interpolate the rest of the horizons to be included in the initial solution. The preliminary horizons may include horizons that are picked automatically, horizons that are picked manually, and/or horizons that are derived automatically from manually picked locations. As another non-limiting example, the initial solution may be derived from the volume information using an algorithm described in U.S. patent application Ser. No. 12/029,196, entitled "Method for Determining Geological Information Related to A Subsurface Volume of Interest," and filed Feb. 11, 2008, now U.S. Pat. No. 7,769,545; and/or U.S. patent application Ser. No. 12/029,216, entitled "Method for Indexing a Subsurface Volume for the Purpose of Inferring Geologic Information," and filed Feb. 11, 2008, now U.S. Pat. No. 7,769,546. Each of the foregoing applications is hereby incorporated by reference in its entirety into the present disclosure. Initial solutions determined via other techniques and/or algorithms may obtained at operation 14 without departing from the scope of this disclosure.

At an operation 16, one or more parameters for perturbation of the horizons in the initial solution are obtained. The parameters may be obtained from electronic storage, may be received via user input (e.g., setting selection and/or specification), and/or may be obtained from other sources. The parameters may impact the perturbation of the horizons in one or more various ways. For example, one or more of the parameters may impact how closely horizons in a final solution match the horizons in the initial solution, may impact permitted discontinuity in horizons in a final solution derived by perturbing the initial solution, may impact a smoothness of the perturbations introduced to the horizons of the initial solution, and/or may have other impacts on the perturbation of the horizons in the initial solution. By way of non-limiting example, the one or more parameters obtained at operation 16 may include one or more of a weighting parameter, a smoothing parameter, discontinuity information identifying the spatial location and orientation of one or more horizon discontinuities (e.g., a fault model and/or other discontinuity information), and/or other parameters.

At an operation 18, the horizons in the initial solution are perturbed to provide a final horizon-picking solution. The final horizon-picking solution includes a final set of horizons. Individual horizons in the final solution may have a one-to-one relationship with a corresponding horizon in the initial solution, a one-to-many relationships with a corresponding plurality of horizons in the initial solution, and/or a many-to-one relationship with a corresponding horizon in the initial solution.

Perturbing the initial solution at operation 18 may include perturbing a plurality (e.g., some or all) of the horizons in the initial solution. This perturbation may be simultaneous for some or all of the horizons. The horizons in the initial solution may be perturbed at operation 18 to follow local features present in the volume information obtained at operation 12. The local features present in the volume information may include, for example, features defined by a common local seismic phase, minimum variance of local seismic phase, common local seismic amplitude, minimum variance of the local seismic amplitude, and/or other local features. The local features may be automatically identified and/or located during the perturbation. The identification of the local features may be an explicit operation in an algorithm used to perturb the horizons, and/or the identification may be performed intrinsically by a secondary solution to which the initial solution is fitted.

Perturbing the initial solution at operation 18 may include fitting the horizons in the initial solution to a secondary solution. The secondary solution may be a solution provided by an algorithm that automatically (or semi-automatically) picks horizons from the volume information (e.g., seismic data) obtained at operation 12. This fitting may be performed in accordance with one or more of the parameters obtained at operation 16. For example, the fitting may be performed in accordance with a smoothing parameter, a weighting parameter, and/or other parameters obtained at operation 16.

The fitting of the horizons in the initial solution to a secondary solution may enhance the matching of the horizons in the initial solution to features of the geological volume of interest represented in the volume information. The final solution derived in this manner may have an enhanced accuracy and/or precision over the solution that would be obtained by merely determining the secondary solution from the volume information. For example, in some implementations, the initial solution may be obtained using an algorithm or technique that tends to accurately follow large-scale features represented in the volume information while the secondary solution may be obtained using an algorithm or technique that tends to more accurately follow local features represented in the volume information. By perturbing the horizons of the initial solution using the secondary solution at least some of the advantages of each may be combined in a single solution.

Although a more detailed description of operation 18 is provided herein, in which a particular algorithm is employed as the secondary solution, it will be appreciated that this is not intended to be limiting. Any of a variety of techniques and/or algorithms suitable for determining a secondary solution may be employed in place of the specific algorithm described herein without departing from the scope of this disclosure.

In some implementations, the secondary solution determines horizons through the geological volume of interest automatically based on the volume information. The secondary solution may be determined by identifying the horizons such that, if the individual horizons are considered to correspond to different geologic times, a ratio of the change of geologic time over the change in space within the geological volume of interest (or some representation thereof) is fit to initial estimations of horizon dip as a function of location within the geological volume of interest. For example, the technique for determining the secondary solution starts with two dip volumes, $p_x(t,x,y)$ and $p_y(t,x,y)$ measured from the seismic data, $d(t,x,y)$, and tries to reconstruct the horizon volume $t(\tau,x,y)$, where $\tau$ represents relative geologic time, and where points of equal $\tau$ can be considered to approximate equal time, and t, x, and y are indices representing the vertical and lateral dimensions of the seismic data volume. For convenience, the dependence on x and y can be taken as implicit, so we can write $t(\tau,x,y)$ simply as $t(\tau)$. The resulting horizon volume contains the seismic time (t) as a function of relative geologic time ($\tau$). We can also use vectors to represent data volumes, for instance $\tau$ is a vector representing the horizon volume $t(\tau,x,y)$.

Figure 2A:
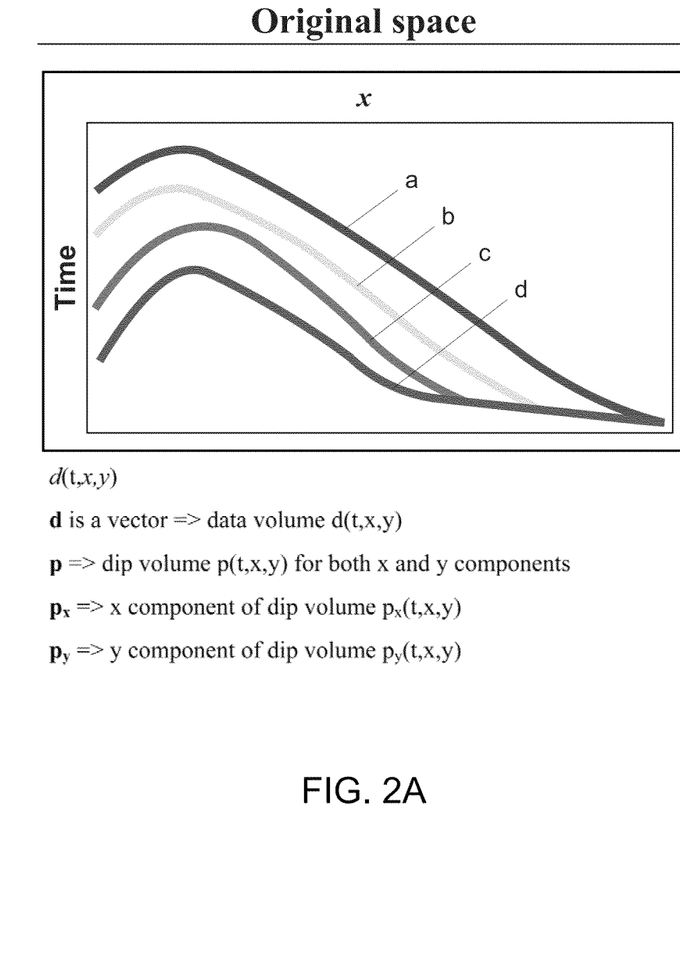
FIG. 2 illustrates 2-dimensional cross-sectional representations of the geological volume of interest.
Figure 2B:
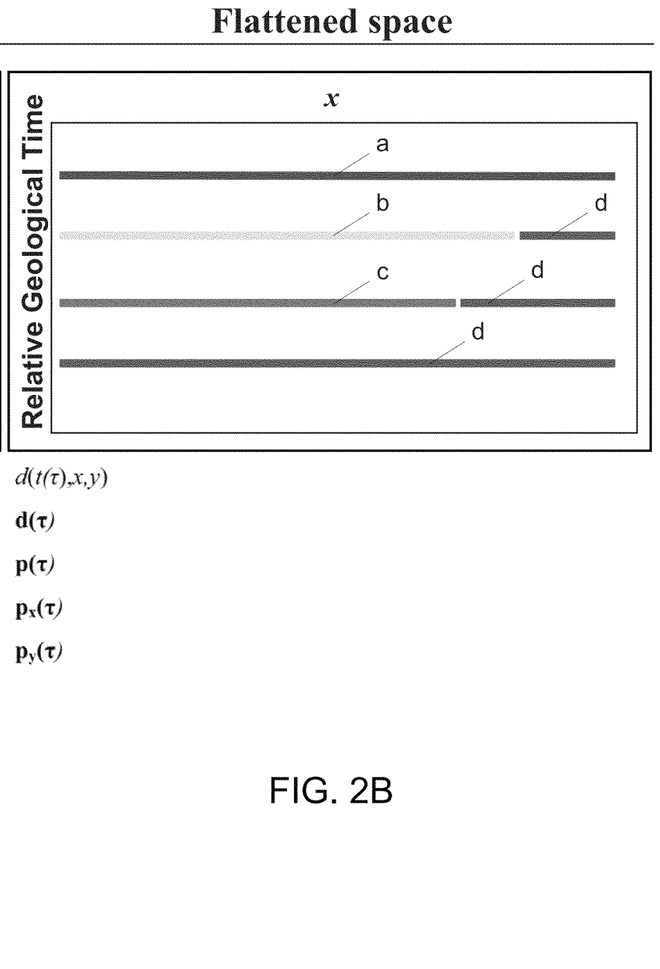

From these pieces, a "flattening" function, $f[d(t),t(\tau)]=d[t(\tau)]$, can be defined that maps from seismic time (1) to flattened, relative geologic time (i). FIG. 2A illustrates a 2-dimensional depiction of the geological volume of interest, and FIG. 2B illustrates a 2-dimensional depiction of the same geological volume of interest flattened along relative geologic time (r). In FIG. 2A, horizons a-d are shown as they would appear in space. In the flattened version of the geological volume of interest shown in FIG. 2B, horizons a-d have been flattened.

In the flattened space shown in FIG. 2B, the dip along a horizon is the change in seismic time per horizontal unit:

$$p_x(\tau)=\nabla_x t(\tau) \text{ and } p_y(\tau)=\nabla_y t(\tau) \qquad (1).$$

The technique for determining the secondary solution seeks to minimize the least-squares misfit between the lateral derivatives of the $t(\tau)$ function and the measured dip fields in flattened space with respect to the $t(\tau)$ function. Mathematically this is defined by the objective function:

$$E = \left| \begin{matrix} V_x \tau - p_x(\tau) \\ V_y \tau - p_y(\tau) \end{matrix} \right|^2, \qquad (2)$$

where $\tau$, $p_x(\tau)$ and $p_y(\tau)$ are vectors containing the horizon volume, $t(n$, and the two dip fields, $p_x$ and $p_y$, respectively. This is an overdetermined system of equations; however, since T occurs in both terms for each component of the objective function, it is nonlinear and must be solved iteratively. Variations on this basic algorithm involve supplementing equation (2) with additional constraint terms and weighting residuals to improve performance, one of which is defined below. In concept these algorithms are similar to multi-dimensional least-squares phase-unwrapping algorithms. However, the use of dip rather than instantaneous phase may reduce problems associated with cycle-skipping.

(34) Equation (2) may be represented as:

$$\nabla \tau - p(\tau) \approx 0 \qquad (3).$$

Equation (3) may be referred to as the "dip fitting goal." Referring back to FIG. 1, if the initial solution obtained at operation 14 is represented as $\tau_0$, then the dip fitting goal expressed in equation (3) may be augmented with an initial solution fitting goal as follows:

$$\epsilon S[\tau - \tau_0] \approx 0 \quad (4).$$

This fitting goal will seek to match the solution $\tau$ field to the initial solution $\tau_0$. The S term represents a smoothing operator. This can be, for example, a simple triangular filter operator that has three dimensions of smoothing defined by rect1, rect2, rect3. As another non-limiting example, it can be an FFT defined by bandpass parameters. The purpose of this operator is to match a smoothed version of the $\tau$ field to a smoothed version of the initial solution $\tau_0$. The smoothing operator and/or its accompanying parameters may be obtained at operation 16.

The fitting goal expressed in equation (4) will permit the inversion to match the local details of the dip fitting goal of equation (3) (e.g., corresponding to the secondary solution). The fitting goal of equation (4) may allow the broad trends of the solution to be restricted by the initial solution. This may enhance accuracy and/or precision by including in the final solution at least some high frequency geomorphological details represented in the secondary solution—details which the initial solution may miss or gloss over. As another example, this may combine fault throw information taken from the initial solution with the local details of the dip fitting goals resulting in a solution that is largely automated on the small scale but successfully correlates across faults. The $\epsilon$ parameter is a scalar to balance the two fitting goals. This parameter may be obtained at operation 16.

Based on equations (3) and (4), equation (2) can be rewritten as:

$$E = \left\| \begin{bmatrix} \epsilon W_s(\tau) S \\ W_d(\tau) \\ W_d(\tau) \end{bmatrix} \begin{bmatrix} I \\ \nabla_x \\ \nabla_y \end{bmatrix} \tau - \begin{bmatrix} \tau_0 \\ p_x(\tau) \\ p_y(\tau) \end{bmatrix} \right\|^2 \quad (5)$$

Where I is an identity matrix. $W_s$ is a diagonal weight applied to the stratal slice fitting goal. $W_d$ is a diagonal weight applied to the dip fitting goal. This may be expressed as:

$$W_s(\tau), W_d(\tau) = \begin{bmatrix} w_{1,1} & 0 & 0 & 0 \\ 0 & w_{2,2} & 0 & 0 \\ 0 & 0 & \ddots & 0 \\ 0 & 0 & 0 & w_{n,m} \end{bmatrix} \quad (6)$$

The reason for distinct weights, Wd and Ws, is for handling faults and unconformities. Wd will often contain a binary fault weight that is zeros at the faults. Ws will typically be an identity matrix but can be used to remove the stratal fitting goal at certain locations. This may ostensibly be useful in the case of angular unconformities. One or more of I, $W_s$, and/or $W_d$ may be obtained at operation 16.

Solution of equation (5) will perturb the horizons of the initial solution $\tau_0$ by fitting these horizons to horizons determined according to the secondary solution $\tau$. The perturbation may occur simultaneously across some or all of the horizons, rather than serially for individual horizons. The perturbation may snap the horizons of the initial solution to one or more local features of the volume information acquired at operation 12.

Figure 3A:
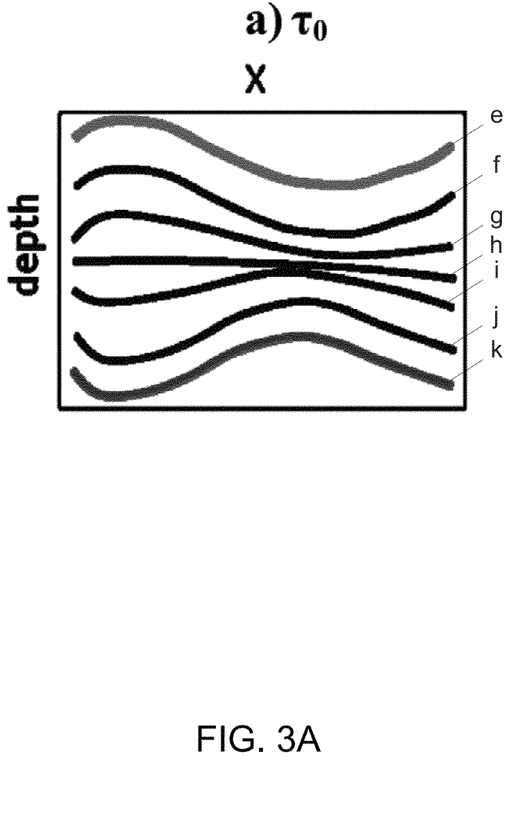
FIG. 3 illustrates a 2-dimensional cross-sectional representation of an initial and final horizon-picking solution for a geological volume of interest.
Figure 3B:
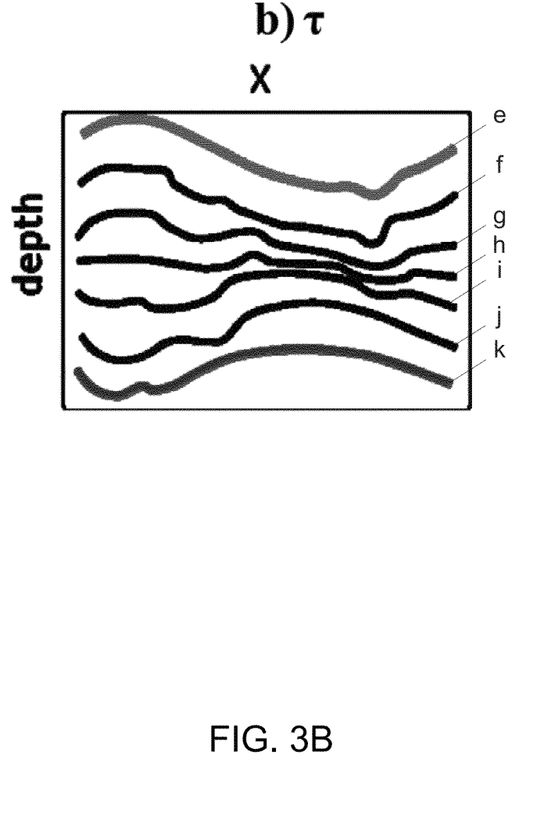

The results of this type of perturbation is illustrated, for example, in FIGS. 3A and 3B. FIG. 3A provides a two-dimensional cross-sectional view of horizons e-k in an initial solution $\tau_0$. FIG. 3B provides a two-dimensional cross-sectional view of horizons e-k after the horizons e-k have been perturbed for perturbed solution $\tau$. As can be seen in FIGS. 3A and 3B, the overall form of the horizons e-k in the final solution matches the horizons e-k of the initial solution. However, the horizons e-k in the final solution have been perturbed to more closely follow local features of underlying volume information.

Figure 4A:
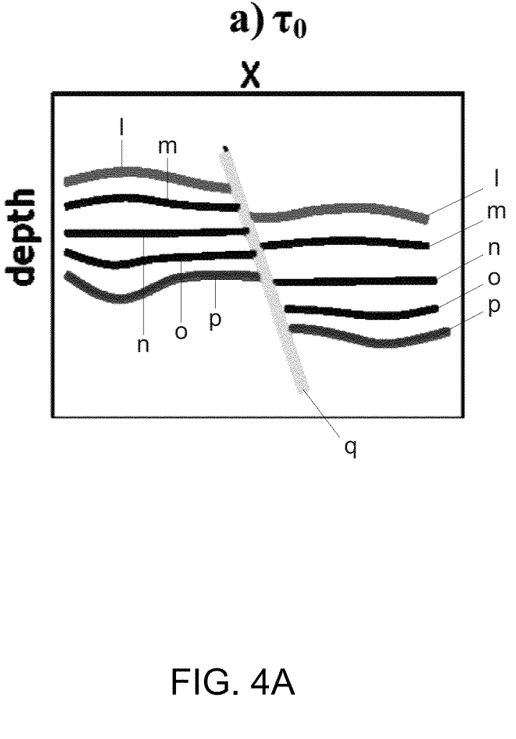
FIG. 4 illustrates an initial and final horizon-picking solution for a geological volume of interest.
Figure 4B:
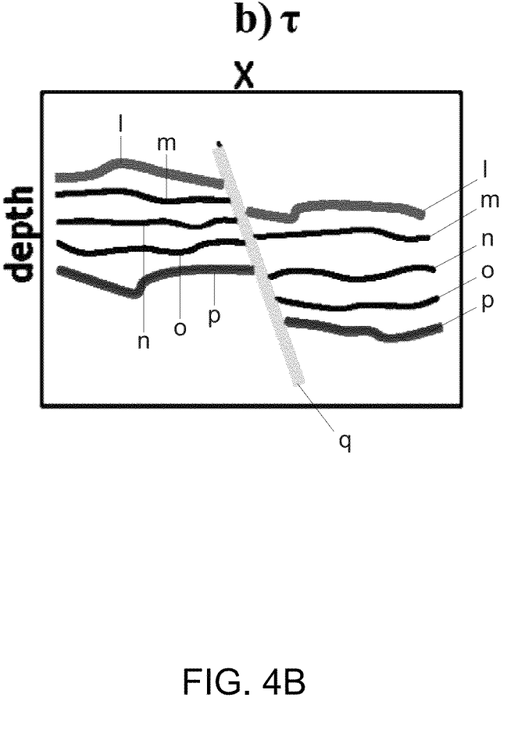

FIGS. 4A and 4B illustrate similar views of a geological volume of interest in which horizons of the initial solution have been cut by a fault q. In particular, FIG. 4A illustrates horizons l-p as part of an initial solution $\tau_0$. FIG. 4B illustrates horizons l-p after being perturbed from an initial solution $\tau_0$ into perturbed solution $\tau$. As can be seen in FIGS. 4A-4B, perturbing the horizons of the initial solution result in a final solution that reflect the horizon discontinuity caused by the fault q, and have been perturbed to match local features of the underlying volume information.

Figure 5:
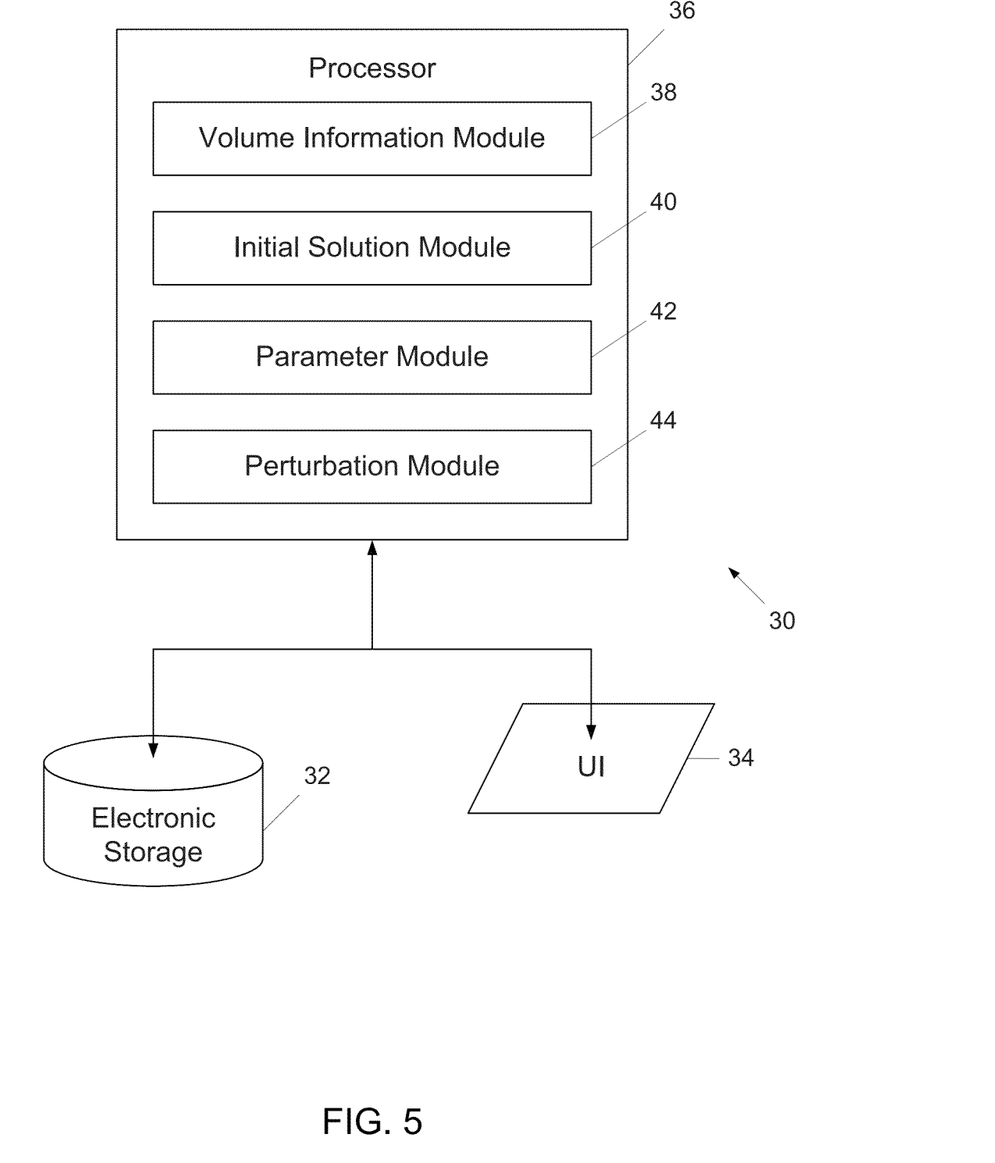
FIG. 5 illustrates a system configured to determine a horizon-picking solution for a geological volume of interest.

FIG. 5 illustrates a system 30 configured to determine a horizon-picking solution within a geological volume of interest. The system 30 may include electronic storage 32, a user interface 34, one or more processors 36, and/or other components.

Electronic storage 32 includes electronic storage media that electronically stores information. The electronic storage media of electronic storage 32 may include one or both of system storage that is provided integrally (i.e., substantially non-removable) with system 30 and/or removable storage that is removably connectable to system 30 via, for example, a port (e.g., a USB port, a firewire port, etc.) or a drive (e.g., a disk drive, etc.). Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 32 may include virtual storage resources, such as storage resources provided via a cloud and/or a virtual private network. Electronic storage 32 may store software algorithms, information determined by processor 36, information received via user interface 34, and/or other information that enables system 30 to function properly. Electronic storage 32 may be a separate component within system 30, or electronic storage 32 may be provided integrally with one or more other components of system 30 (e.g., processor 36).

User interface 34 is configured to provide an interface between system 30 and one or more users through which the users may provide information to and receive information from system 30. This enables data, results, and/or instructions and any other communicable items, collectively referred to as "information," to be communicated between the users and system 30. Examples of interface devices suitable for inclusion in user interface 34 include a keypad, buttons, switches, a keyboard, knobs, levers, a display screen, a touch screen, speakers, a microphone, an indicator light, an audible alarm, and a printer.

It is to be understood that other communication techniques, either hard-wired or wireless, are also contemplated by the present invention as user interface 34. For example, the present invention contemplates that user interface 34 may be integrated with a removable storage interface provided by electronic storage 32. In this example, information may be loaded into system 30 from removable storage (e.g., a smart card, a flash drive, a removable disk, etc.) that enables the user(s) to customize the implementation of system 30. Other exemplary input devices and techniques adapted for use with system 30 as user interface 34 include, but are not limited to, an RS-232 port, RF link, an IR link, modem (telephone, cable or other). In short, any technique for communicating information with system 30 is contemplated by the present invention as user interface 34.

Processor 36 is configured to provide information processing capabilities in system 30. As such, processor 36 may include one or more of a digital processor, an analog processor, a digital circuit designed to process information, an analog circuit designed to process information, a state machine, and/or other mechanisms for electronically processing information. Although processor 36 is shown in FIG. 5 as a single entity, this is for illustrative purposes only. In some implementations, processor 36 may include a plurality of processing units. These processing units may be physically located within the same device, or processor 36 may represent processing functionality of a plurality of devices operating in coordination.

As is shown in FIG. 5, processor 36 may be configured to execute one or more computer program modules. The one or more computer program modules may include one or more of a volume information module 38, an initial solution module 40, a parameter module 42, a perturbation module 44, and/or other modules. Processor 36 may be configured to execute modules 38, 40, 42, and/or 44 by software; hardware; firmware; some combination of software, hardware, and/or firmware; and/or other mechanisms for configuring processing capabilities on processor 36.

It should be appreciated that although modules 38, 40, 42, and/or 44 are illustrated in FIG. 5 as being co-located within a single processing unit, in implementations in which processor 36 includes multiple processing units, one or more of modules 38, 40, 42, and/or 44 may be located remotely from the other modules. The description of the functionality provided by the different modules 38, 40, 42, and/or 44 described below is for illustrative purposes, and is not intended to be limiting, as any of modules 38, 40, 42, and/or 44 may provide more or less functionality than is described. For example, one or more of modules 38, 40, 42, and/or 44 may be eliminated, and some or all of its functionality may be provided by other ones of modules 38, 40, 42, and/or 44. As another example, processor 36 may be configured to execute one or more additional modules that may perform some or all of the functionality attributed below to one of modules 38, 40, 42, and/or 44.

The volume information module 38 is configured to obtain volume information related to the geological volume of interest. The volume information may include one or more of seismic data acquired at or near the geological volume of interest, well data acquired at or near the geological volume of interest, core data from the geological volume of interest, a model (or other representation) of the geological volume of interest, and/or other information related to geological volume of interest. In some implementations, volume information module 38 is configured to provide some or all of the functionality described with respect to operation 12 (shown in FIG. 1 and described herein).

The initial solution module 40 is configured to obtain an initial horizon-picking solution. The initial solution includes a set of horizons running through the geological volume of interest that are represented by the volume information. The initial solution may be obtained from electronic storage (e.g., electronic storage 32), determined based on the volume information, and/or obtained from other sources. In some implementations, initial solution module 40 may provide some or all of the functionality described with respect to operation 14 (shown in FIG. 1 and described herein).

The parameter module 42 may be configured to obtain one or more parameters of a perturbation to be performed on the initial solution. In some implementations, parameter module 42 may provide some or all of the functionality described with respect to operation 16 (shown in FIG. 1 and described herein).

The perturbation module 44 is configured to perturb the horizons in the initial solution. This perturbation results in a final horizon-picking solution that includes a set of horizons. The perturbation of the horizons in the initial solution may perturb the horizons simultaneously. The perturbation may adjust the horizons to coincide with local features of the geological volume of interest reflected in the volume information. These local features may be identified automatically (e.g., during the perturbation). In some implementations, perturbation module 44 may provide some or all of the functionality described with respect to operation 18 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

The invention claimed is:

1. A method of determining a horizon-picking solution within a geological volume of interest, the method comprising:

obtaining volume information representing a geological volume of interest;

obtaining an initial horizon-picking solution for the geological volume of interest derived from the volume information, wherein the initial horizon-picking solution includes an initial set of horizons through the geological volume of interest; and determining a final horizon-picking solution for the geological volume of interest to obtain a final set of horizons through the geological volume of interest by perturbing the horizons in the initial set of horizons simultaneously to follow local features of the geological volume of interest represented in the volume information using the following equation:

$$E = \left\| \begin{bmatrix} \varepsilon W_s(\tau)S \\ W_d(\tau) \\ W_d(\tau) \end{bmatrix} \begin{bmatrix} I \\ \nabla_x \\ \nabla_y \end{bmatrix} \tau - \begin{bmatrix} \tau_0 \\ p_x(\tau) \\ p_y(\tau) \end{bmatrix} \right\|^2$$

where S is a smoothing operator, $\varepsilon$ is a smoothing parameter, $W_d$ is a diagonal weight applied to a dip fitting goal, $W_s$ is a diagonal weight applied to a stratal slicing goal, I is an identity matrix, $\tau$ is the final horizon-picking solution, and $\tau_0$ is the initial horizon-picking solution.

2. The method of claim 1, wherein perturbing the horizons in the initial set of horizons comprises fitting the initial horizon-picking solution to a secondary horizon-picking solution that is configured to simultaneously determine horizons through the geological volume of interest that correspond to local features represented in the volume information.

3. The method of claim 2, wherein the secondary horizon-picking solution simultaneously determines horizons through the geological volume of interest by identifying horizons such that, if the individual horizons are considered to correspond to different geologic times, a ratio of the change of geologic time over the change in position in the horizontal plane is fit to horizon dip.

4. The method of claim 1, wherein the volume information includes a model of the geological volume of interest derived from seismic data acquired at or near the geological volume of interest.

5. The method of claim 1, further comprising obtaining one or more perturbation parameters that impact the perturbation of the initial solution.

6. The method of claim 5, wherein the one or more perturbation parameters comprise one or more of a smoothing parameter, a weighting parameter, or a discontinuity information specifying the spatial location of a horizon discontinuity within the geological volume of interest.

7. The method of claim 1, wherein the initial solution comprises a strata slicing solution in which one or more horizons have been interpolated or extrapolated from one or more reference horizons included in the initial solution.

8. Machine-readable, non-transient, electronic storage storing processor-executable instructions for performing a method of determining a horizon-picking solution within a geological volume of interest, the method comprising:
obtaining volume information representing a geological volume of interest;
obtaining an initial horizon-picking solution for the geological volume of interest derived from the volume information, wherein the initial horizon-picking solution includes an initial set of horizons through the geological volume of interest; and
determining a final horizon-picking solution for the geological volume of interest to obtain a final set of horizons through the geological volume of interest by perturbing the horizons in the initial set of horizons simultaneously to follow local features of the geological volume of interest represented in the volume information using the following equation:

$$E = \left\| \left[ \begin{array}{c} \varepsilon W_s(\tau)S \\ W_d(\tau) \\ W_d(\tau) \end{array} \right] \left[ \begin{array}{c} I \\ \nabla_x \\ \nabla_y \end{array} \right] \tau - \left[ \begin{array}{c} \tau_0 \\ p_x(\tau) \\ p_y(\tau) \end{array} \right] \right\|^2$$

where S is a smoothing operator, $\varepsilon$ is a smoothing parameter, $W_d$ is a diagonal weight applied to a dip fitting goal, $W_s$ is a diagonal weight applied to a stratal slicing goal, I is an identity matrix, $\tau$ is the final horizon picking solution, and $\tau_0$ is the initial horizon solution.

9. The electronic storage of claim 8, wherein perturbing the horizons in the initial set of horizons comprises fitting the initial horizon-picking solution to a secondary horizon-picking solution that is configured to simultaneously determine horizons through the geological volume of interest that correspond to local features represented in the volume information.

10. The electronic storage of claim 9, wherein the secondary horizon-picking solution simultaneously determines horizons through the geological volume of interest by identifying horizons such that, if the individual horizons are considered to correspond to different geologic times, a ratio of the change of geologic time over the change in position in the horizontal plane is fit to horizon dip.

11. The electronic storage of claim 8, wherein the volume information includes a model of the geological volume of interest derived from seismic data acquired at or near the geological volume of interest.

12. The electronic storage of claim 8, wherein the method further comprises obtaining one or more perturbation parameters that impact the perturbation of the initial solution.

13. The electronic storage of claim 12, wherein the one or more perturbation parameters comprise one or more of a smoothing parameter, a weighting parameter, or a discontinuity information specifying the spatial location of a horizon discontinuity within the geological volume of interest.

14. The electronic storage of claim 8, wherein the initial solution includes one or more horizons that have been interpolated or extrapolated from one or more reference horizons included in the initial solution.

15. A system configured to determine a horizon-picking solution within a geological volume of interest, the system comprising:
one or more processors configured to execute computer program modules, the computer program modules comprising:
a volume information module configured to obtain volume information representing a geological volume of interest;
an initial solution module configured to obtain an initial horizon-picking solution for the geological volume of interest derived from the volume information, wherein the initial horizon-picking solution includes an initial set of horizons through the geological volume of interest; and
a perturbation module configured to determine a final horizon-picking solution for the geological volume of interest by perturbing the horizons in the initial set of horizons simultaneously to follow local features of the geological volume of interest represented in the volume information using the following equation:

$$E = \left\| \left[ \begin{array}{c} \varepsilon W_s(\tau)S \\ W_d(\tau) \\ W_d(\tau) \end{array} \right] \left[ \begin{array}{c} I \\ \nabla_x \\ \nabla_y \end{array} \right] \tau - \left[ \begin{array}{c} \tau_0 \\ p_x(\tau) \\ p_y(\tau) \end{array} \right] \right\|^2$$

where S is a smoothing operator, $\varepsilon$ is a smoothing parameter, $W_d$ is a diagonal weight applied to a dip fitting goal, $W_s$ is a diagonal weight applied to a stratal slicing goal, I is an identity matrix, $\tau$ is the final horizon picking solution, and $\tau_0$ is the initial horizon solution.

16. The system of claim 15, wherein the perturbation module is configured such that perturbing the horizons in the initial set of horizons comprises fitting the initial horizon-picking solution to a secondary horizon-picking solution that is configured to simultaneously determine horizons through the geological volume of interest that correspond to local features represented in the volume information.

17. The system of claim 16, wherein the perturbation module is configured such that the secondary horizon-picking solution simultaneously determines horizons through the geological volume of interest by identifying horizons such that, if the individual horizons are considered to correspond to different geologic times, a ratio of the change of geologic time over the change in position in the horizontal plane is fit to horizon dip.

18. The system of claim 15, wherein the volume information module is configured such that the volume information includes a model of the geological volume of interest derived from seismic data acquired at or near the geological volume of interest.

19. The system of claim 15, wherein the computer program modules further comprise a parameter module configured to obtain one or more perturbation parameters that impact the perturbation of the initial solution by the perturbation module.

20. The system of claim 19, wherein the parameter module is configured such that the one or more perturbation parameters comprise one or more of a smoothing parameter, a weighting parameter, or a discontinuity information specifying the spatial location of a horizon discontinuity within the geological volume of interest.

21. The system of claim 15, wherein the initial solution module is configured such that the initial solution includes one or more horizons that have been interpolated or extrapolated from one or more reference horizons included in the initial solution.

* * * * *